(12) United States Patent
Lee et al.

(10) Patent No.: US 8,437,641 B2
(45) Date of Patent: May 7, 2013

(54) CLOCK REGENERATION FOR OPTICAL COMMUNICATIONS

(75) Inventors: Barry Tsai Lung Lee, Union City, CA (US); Chu-Jyh Chang, San Jose, CA (US); Goichoro Ono, San Jose, CA (US)

(73) Assignee: Bay Microsystems, Inc., San Jose, CA (US)

(*) Notice: Subject to any disclaimer, the term of this patent is extended or adjusted under 35 U.S.C. 154(b) by 641 days.

(21) Appl. No.: 12/603,501

(22) Filed: Oct. 21, 2009

(65) Prior Publication Data
US 2010/0098432 A1    Apr. 22, 2010

Related U.S. Application Data

(60) Provisional application No. 61/107,298, filed on Oct. 21, 2008.

(51) Int. Cl.
*H04B 10/00* (2006.01)

(52) U.S. Cl.
USPC .......................................... 398/155; 398/154

(58) Field of Classification Search ................. 398/154, 398/155; 370/503, 518
See application file for complete search history.

(56) References Cited

U.S. PATENT DOCUMENTS

| 7,286,568 | B2 | 10/2007 | Christiansen |
| 7,366,206 | B2* | 4/2008 | Lockridge et al. ............ 370/509 |
| 7,564,875 | B2 | 7/2009 | Linkewitsch et al. |
| 7,660,330 | B1* | 2/2010 | Shmilovici ................... 370/503 |
| 2007/0116061 | A1 | 5/2007 | Meagher et al. |
| 2007/0183551 | A1 | 8/2007 | Ji et al. |
| 2007/0223484 | A1* | 9/2007 | Crowle et al. ................. 370/394 |
| 2009/0086767 | A1 | 4/2009 | Li |

FOREIGN PATENT DOCUMENTS

EP    1804440 A1    4/2007

* cited by examiner

*Primary Examiner* — Dalzid Singh

(57) ABSTRACT

A system and method for regenerating a client clock signal for use in optical communications is disclosed. The system and method involves using a carrier clock signal and a client clock signal to calculate quantities of data that are received and transmitted at an edge node and then adjusting a clock source in response to the difference between the calculated quantities of received and transmitted data.

18 Claims, 7 Drawing Sheets

| | Carrier (OTN) | Carrier OTN FEC | Client | Carrier Frame Format | Carrier Clock Count | Effective Carrier Data Byte | Client Clock Count | Consumed Client Data Byte |
|---|---|---|---|---|---|---|---|---|
| ODUkp to CBRx/RSn adaptation | OPU3 | with | CBR40G | 16 CH + 1248 D + 16 FS + 1264 D + 16 FS + 1264 D + 256 FEC | 255 | 3776 | 0 | 96 |
| | OPU3 | without | CBR40G | 16 CH + 1248 D + 16 FS + 1264 D + 16 FS + 1264 D | 239 | 3776 | 0 | 96 |
| | OPU2 | with | CBR10G | 16 CH + 1888 D + 16 FS + 1904 D + 256 FEC | 255 | 948 | 0 | 24 |
| | OPU2 | without | CBR10G | 16 CH + 1888 D + 16 FS + 1904 D | 239 | 948 | 0 | 24 |
| | OPU2e | with | 10GE | 16 CH + 1888 D + 16 FS + 1904 D + 256 FEC | 255 | 948 | 0 | 24 |
| | OPU2e | without | 10GE | 16 CH + 1888 D + 16 FS + 1904 D | 239 | 948 | 0 | 24 |
| | OPU1e | with | 10GE | 16 CH + 3808 D + 256 FEC | 255 | 952 | 0 | 24 |
| | OPU1e | without | 10GE | 16 CH + 3808 D | 239 | 952 | 0 | 24 |
| ODUkp to CBRx/RSn + ODTU23 adaptation | OPU2 in OPU3 | with | ODU2 | 16 CH + 3808 D + 256 FEC -> 3824 ODU2 | 255 | | | 24 |
| | OPU2 in OPU3 | without | ODU2 | 16 CH + 3808 D -> 3824 ODU2 | 239 | | | 24 |
| | OPU2 in OPU3 | with | OTU2 | 16 CH + 3808 D + 256 FEC -> 3824 ODU2_D + 256 FS | 255 | 952 × 255/239 | | 24 |
| | OPU2 in OPU3 | without | OTU2 | 16 CH + 3808 D -> 3824 ODU2_D + 256 FS | 239 | 952 × 255/239 | | 24 |
| | OPU2 in OPU3 | with | CBR10G | 16 CH + 3808 D + 256 FEC -> 16 OH + 3792 D + 16 FS | 255 | 952 × 237/239 | 0 | 24 |
| | OPU2 in OPU3 | without | CBR10G | 16 CH + 3808 D -> 16 OH + 3792 D + 16 FS | 239 | 952 × 237/239 | 0 | 24 |
| | OPU2e in OPU3 | with | 10GE | 16 CH + 3808 D + 256 FEC -> 16 OH + 3792 D + 16 FS | 255 | 952 × 237/239 | 0 | 24 |
| | OPU2e in OPU3 | without | 10GE | 16 CH + 3808 D -> 16 OH + 3792 D + 16 FS | 239 | 952 × 237/239 | 0 | 24 |
| | OPU1e in OPU3 | with | 10GE | 16 CH + 3808 D + 256 FEC -> 16 OH + 3808 D | 255 | 952 × 238/239 | 0 | 24 |
| | OPU1e in OPU3 | without | 10GE | 16 CH + 3808 D -> 16 OH + 3808 D | 239 | 952 × 238/239 | 0 | 24 |

FIG. 7

CLOCK REGENERATION FOR OPTICAL COMMUNICATIONS

CROSS-REFERENCE TO RELATED APPLICATIONS

This application is entitled to the benefit of provisional U.S. Patent Application Ser. No. 61/107,298, filed Oct. 21, 2008, the disclosure of which is incorporated by reference herein in its entirety.

FIELD OF THE INVENTION

The invention relates generally to optical network communications, and more particularly to a system and method for regenerating a clock for use in optical communications.

BACKGROUND OF THE INVENTION

In modern communications networks, data can pass through multiple different optical communications networks as it travels from its initial source to its final destination. The transmission of data through optical networks is dependent on precise clocking and different networks use different clocks. In some cases, client networks that use a first clock signal are interconnected by a carrier network that uses a different clock signal. Within the carrier network, data is transmitted using a carrier clock signal but upon egress from the carrier network, the client clock signal must be regenerated to transmit the data within the client network.

Conventional clock recovery techniques use phase locked loops at the analog signal level to recover the desired clock signal. These clock recovery techniques are typically designed to handle one network configuration. However, there are many different combinations of optical networks that can interface with each other, with each different combination of optical networks having unique clock recovery requirements.

SUMMARY OF THE INVENTION

A system and method for regenerating a client clock signal for use in optical communications involves using a carrier clock signal and a client clock signal to calculate quantities of data that are received and transmitted at an edge node and then adjusting a clock source in response to the difference between the calculated quantities of received and transmitted data.

An embodiment of a system for regenerating a client clock signal for use in optical communications includes a clock signal generator configured to generate a client clock signal and a clock processor configured to receive the client clock signal and a carrier clock signal. The clock processor has a carrier-side quantizer configured to calculate a carrier-side data quantity in response to the carrier clock signal, a client-side quantizer configured to calculate a client-side data quantity in response to the client clock, and a frequency command controller configured to generate a frequency command in response to the difference between the carrier-side data quantity and the client-side data quantity. The clock signal generator is adjusted in response to the frequency command.

In an embodiment, the carrier-side quantizer is configured to equate an interval of the carrier clock signal with a data quantity, to count a number of clock intervals of the carrier clock signal, and to multiply the equated data quantity by the counted number of intervals of the carrier clock signal, and the client-side quantizer is configured to equate an interval of the client clock signal with a data quantity, to count a number of clock intervals of the client clock signal, and to multiply the equated data quantity by the counted number of intervals of the client clock signal.

An embodiment of a method for regenerating a client clock signal for use in optical communications involves generating a client clock signal, calculating a quantity of data that is received at a carrier interface, wherein the calculation is made in response to a carrier clock signal, calculating a quantity of data that is received at a client interface, wherein the calculation is made in response to the client clock signal, and adjusting the frequency of the client clock signal in response to the difference between the quantity of data that is received at the carrier interface and the quantity of data that is received at the client interface.

In an embodiment, calculating the quantity of data that is received at the carrier interface involves equating an interval of the carrier clock signal with a data quantity, counting a number of clock intervals of the carrier clock signal, and multiplying the equated data quantity by the counted number of intervals of the carrier clock signal, and calculating the quantity of data that is received at the client interface involves equating an interval of the client clock signal with a data quantity, counting a number of clock intervals of the client clock signal, and multiplying the equated data quantity by the counted number of intervals of the client clock signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 illustrates a table of conversion factors for three different carrier to client clock conversion applications.

Throughout the description, similar reference numbers may be used to identify similar elements.

DETAILED DESCRIPTION

Figure 1:
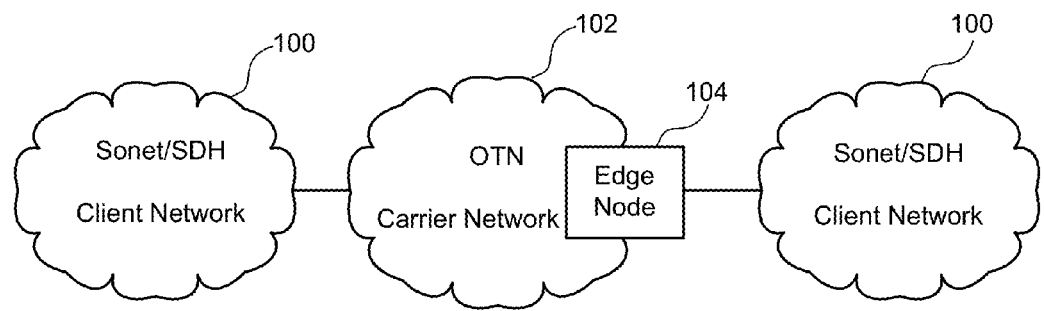
FIG. 1 depicts a network architecture in which two instances of a client network are connected by a carrier network.

FIG. 1 depicts a network architecture in which two instances of a client network 100 are connected by a carrier network 102. In the embodiment of FIG. 1, the client networks are optical networks that utilize a Synchronous Optical Networking (SONET)/Synchronous Digital Hierarchy (SDH) protocol and the carrier network is an Optical Transport Network (OTN) as defined by the International Telecommunications Union-Telecommunications Standardization Sector (ITU-T). The interface between the client network and the carrier network occurs at an edge node 104.

FIG. 1 depicts an example of an edge node 104 that provides the interface for traffic traveling from the carrier network 102 to one of the client networks 100 and for traffic traveling from one of the client networks to the carrier network. In the embodiment of FIG. 1, the edge node is a node that is located within the carrier network although the edge node could alternatively be a node that is located within the client network. Additionally, although one edge node is depicted in FIG. 1, the carrier network may include additional edge nodes.

Figure 2:
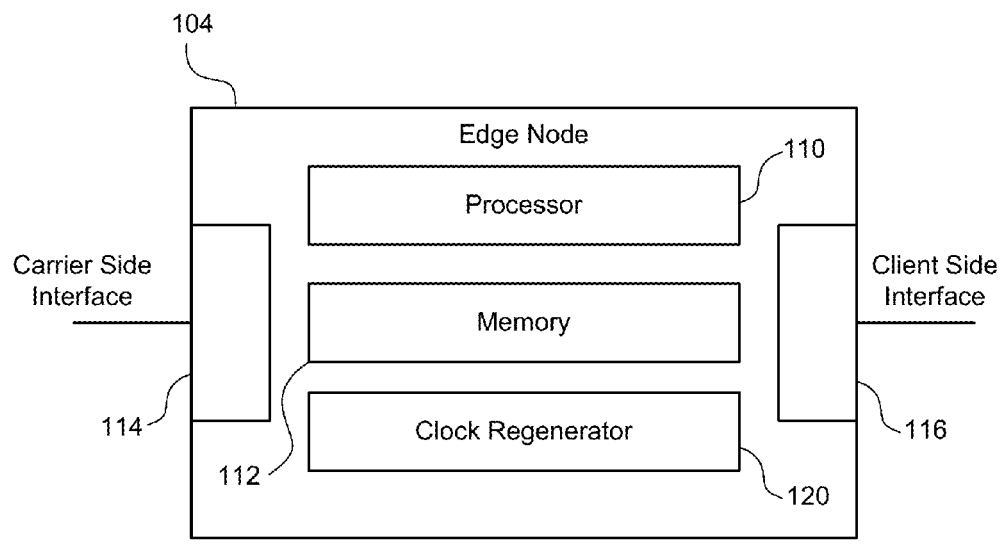
FIG. 2 depicts an expanded view of an embodiment of the edge node of FIG. 1.

FIG. 2 depicts an expanded view of an embodiment of the edge node 104 of FIG. 1. The edge node includes a processor 110, memory 112, a carrier-side interface 114, a client-side interface 116, and a clock regenerator 120. The processor may include, for example, a multifunction processor and/or an application-specific processor and the memory may include, for example, a storage medium such as read only memory (ROM), flash memory, Radom Access Memory (RAM), and/or a large capacity permanent storage device such as a hard disk drive. The edge node may also include additional functional elements that are not depicted in FIG. 2.

The carrier-side and client-side interfaces 114 and 116 enable communications with other network nodes. The carrier-side interface transmits and receives data using OTN protocols and communicates with other OTN interfaces within the carrier network 102. Communications to and from the carrier-side interface are clocked using a carrier clock signal. The client-side interface transmits and receives data using SONET/SDH protocols and communicates with a network node in the client network 100. Communications to and from the client-side interface are clocked using a client clock signal.

Data that passes from a first instance of the client network 100 to a second instance of the client network via the carrier network 102 is originally transmitted from the first instance of the client network using a client clock signal. At the ingress to the carrier network, some clocking information is encoded into the OTN protocol data units and the OTN protocol data units are transmitted within the carrier network using a carrier clock signal. At the egress of the carrier network, the client clock signal must be regenerated so that the client data can be transmitted to the client network. The clock regenerator 120 is configured to regenerate the client clock signal so that the client data can be transmitted to the client network. In accordance with an embodiment of the invention, the clock regenerator uses the carrier and client clock signals to calculate quantities of data that are received and transmitted and then adjusts a clock source in response to the difference between the calculated quantities of received and transmitted data. A description of an embodiment of the clock regenerator is described below with reference to FIGS. 3-8.

Figure 3:
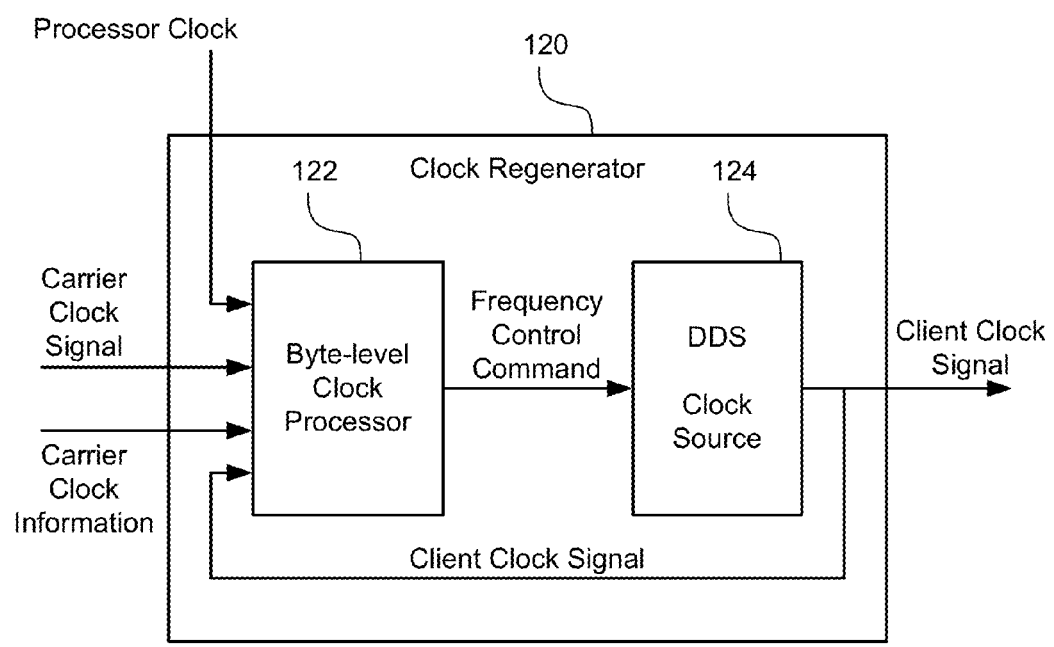
FIG. 3 depicts an expanded view of an embodiment of the clock regenerator from FIG. 2.

FIG. 3 depicts an expanded view of an embodiment of the clock regenerator from FIG. 2, which includes a byte-level clock processor 122 and a direct digital synthesis (DDS) clock source 124. In operation, the DDS clock source generates a client clock signal and the frequency of the client clock signal is adjusted in response to a digital command from the byte-level clock processor. In accordance with an embodiment of the invention, the byte-level clock processor uses the carrier clock signal to calculate the quantity of data that is received at the carrier-side interface of the edge node and uses the client clock signal to calculate the quantity of data that is transmitted from the client-side interface of the edge node and then adjusts the DDS clock source in response to the difference between the quantity of received and transmitted data. In an embodiment, the byte-level clock processor generates a digital frequency control command that is used to adjust the DDS clock source. The quantity of received and transmitted data is calculated by equating an interval of the respective clock signal with a quantity of data, referred to herein as a "conversion factor," and then multiplying a number of clock signal intervals by the conversion factor. This technique for adjusting the client clock signal is data path independent and is easily adaptable to various different transmission speeds and protocols between the carrier and client networks.

As is known in the field, the OTN protocol encodes some clock information into the OTN protocol data unit. In order to accurately calculate the quantity of data that is received using OTN, some adjustments in the quantity of data must be made based on the encoded clock information. In particular, the OTN protocol data unit may include fixed and dynamic adjustments in byte counts that need to be taken into account to calculate the actual amount of client data that is received at the carrier-side interface. A description of the encoded clock information and how the encoded clock information affects the quantity of received data is provided below with reference to FIGS. 5-7.

Figure 4:
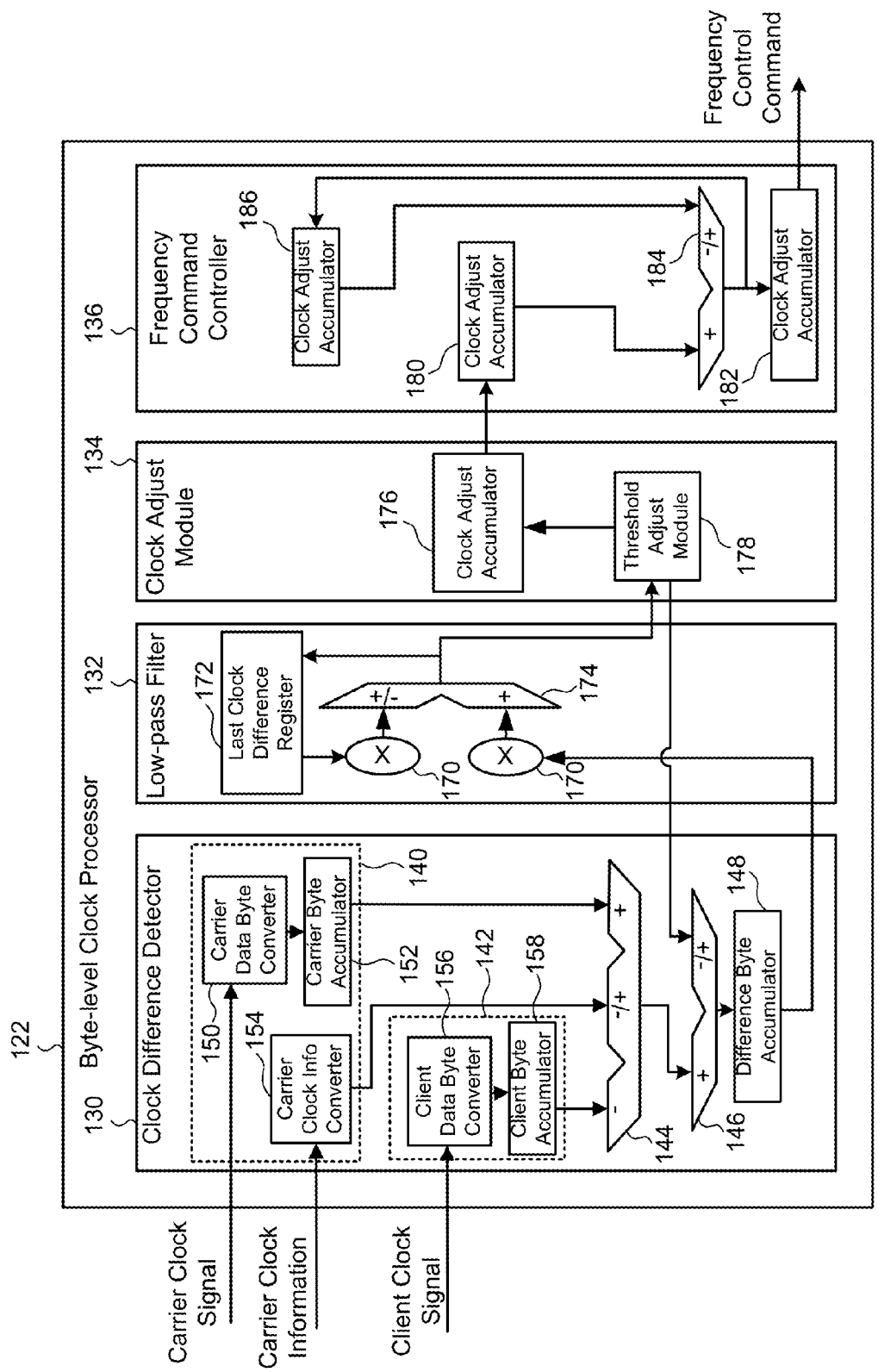
FIG. 4 depicts an expanded view of an embodiment of the byte-level clock processor from FIG. 3.

FIG. 4 depicts an expanded view of an embodiment of the byte-level clock processor 122 from FIG. 3, which includes a clock difference detector 130, a low pass filter 132, a clock adjust module 134, and a frequency command controller 136. The byte-level clock processor is configured to receive the carrier clock signal, the encoded carrier clock information, and the client clock signal and is configured to output a frequency control command that is used by the DDS clock source to adjust the frequency of the client clock signal.

The clock difference detector 130 of the byte-level clock processor 122 is configured to find the difference between the quantity of client data that is received at the edge node and the quantity of client data that is transmitted from the edge node. In the embodiment of FIG. 4, the clock difference detector includes a carrier-side quantizer 140, a client-side quantizer 142, first and second adders 144 and 146, and a byte difference accumulator 148. The carrier-side quantizer 140 includes a carrier data byte convertor 150, a carrier byte accumulator 152, and a carrier clock information interpreter 154. The carrier data byte converter calculates a quantity of data received at the carrier interface using the carrier clock signal. In an embodiment, a quantity of data is equated with an interval of the carrier clock signal. For example, a number of clock cycles or clock counts is equated with a number of bytes that are received. The quantity of data that is equated with the number of clock intervals is the conversion factor. As an example, a conversion factor may specify that 255 counts of the carrier clock signal equates to 3,776 bytes of received client data. Different conversion factors for different clock regeneration scenarios are described in more detail below with reference to FIGS. 5-7.

The carrier data byte convertor 150 is configured to count cycles of the carrier clock signal for some interval and to calculate a quantity of received data by multiplying the number of clock intervals by the conversion factor. Once a clock interval is converted to a quantity of data, the quantity of data is passed to the carrier byte accumulator 152. In an embodiment, the carrier byte accumulator is a register that is incremented in response to each output from the carrier data byte convertor.

The carrier-side quantizer 140 also includes the carrier clock information interpreter 154 that interprets information that is encoded into the OTN protocol data units. The carrier clock information interpreter also adjusts the calculated quantity of data received to account for timing information that is embedded or encoded into the OTN protocol data units.

Adjustments to the calculated quantity of data received are described in more detail below with reference to FIGS. 5-7.

Figures 5, 6:
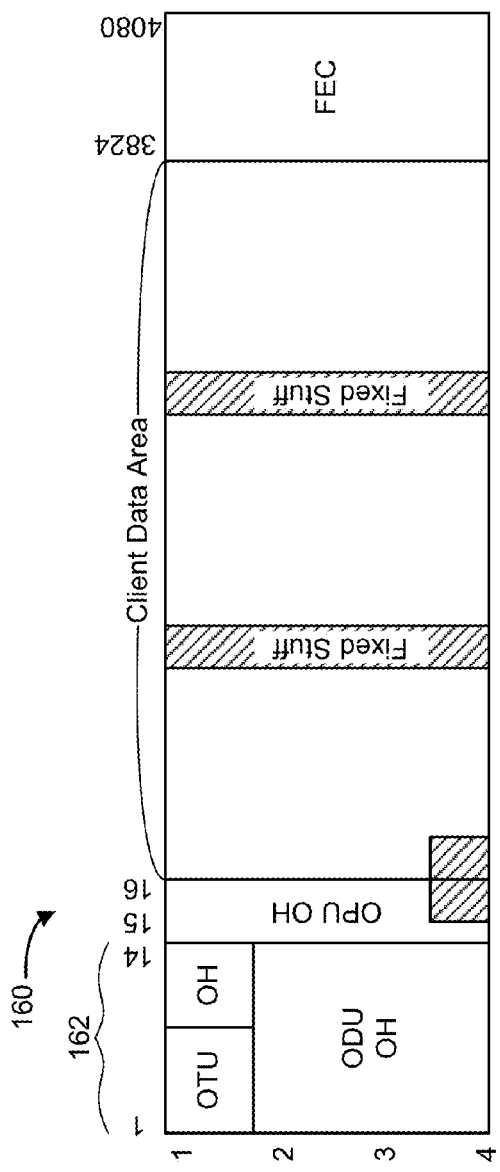
FIG. 5 depicts the frame format of an OTN protocol data unit as defined by the ITU-T.
FIG. 6 depicts an expanded view of the combined overhead of an OTN protocol data unit.

FIG. 5 depicts the frame format of an OTN protocol data unit 160 as defined by the ITU-T. The frame format includes overhead 162 (Optical channel Payload Unit (OPU) overhead, Optical Data Unit (ODU) overhead, and Optical Transport Unit (OTU) overhead), client data, OTU Forward Error Correction (FEC) information, and may include fixed stuffing. The fixed stuffing is added in the case of OPU2 and OPU3 in order to allow for future ODU multiplexing. The fixed stuffing is not client data and therefore, the conversion factors for data received at the carrier-side interface must be adjusted to compensate for the fixed stuffing. To calculate the amount of actual client data that is carried in an OTN protocol data unit, the overhead, FEC, and fixed stuffing needs to be subtracted from the total size of the OTN protocol data unit. In an embodiment, the quantity of client data received at the carrier-side interface needs to be reduced by the amount of the fixed stuffing, e.g., by 2×16 bytes per OTU protocol data unit.

FIG. 6 depicts an expanded view of the combined overhead 162 of an OTN protocol data unit. The expanded view includes the OPU overhead fields, the ODU overhead fields, and the OTU overhead fields as specified by the ITU-T. The OPU overhead includes Reserved (RES), Justification Control (JC), Negative Justification Opportunity (NJO), and Positive Justification Opportunity (PJO) fields, the ODU overhead includes RES, TCM/ACT, TCM6, TCM5, TCM4, FTFL, TCM3, TCM2, TCM1, PM, EXP, GCC0, GCC0, APS/PCC, and RES fields, and the OTU overhead includes FAS, MFAS, SM, GCC0, and RES fields. All of the fields depicted in FIG. 6 are known and the fields in the OTU and ODU overhead are not described in detail herein.

In the OPU overhead, the JC, NJO, and PJO fields of the clock overhead are used for Constant Bit Rate (CBR) adaption functions as specified by ITU-T G.798. In particular, there are three JC bytes, each containing two JC bits. The two JC bits are used to indicate whether the negative or positive justification opportunity bytes contain client data. A majority vote, e.g., two out of three JC bytes, are used for error protection. According to the OTN protocol, when JC is "00", NJO is a justification byte (not client data) and PJO is client data, when JC is "01", NJO and PJO are client data, when JC is "10", NJO is a justification byte (not client data) and PJO is client data, and when JC is "11", both NJO and PJO are justification bytes (not client data). For the multiplexing adaption function defined in ITU G.798, the clock information is slightly different from the CBR adaptation function, but the underneath concepts are the same.

To calculate the actual quantity of client data that is received at the carrier-side interface 114 of the edge node 104, the dynamic adjustments as indicated by the JC bytes in the OPU overhead need to be taken into account. In particular, the quantity of client data that is received at the carrier-side interface needs to be increased or decreased to account for the dynamic adjustments, e.g., in response to the JC bytes. The carrier clock information interpreter reads the JC bytes and adjusts the quantity of data accordingly.

Referring back to FIG. 4, the client-side quantizer 142 includes a client data byte convertor 156 and a client byte accumulator 158. The client data byte converter calculates a quantity of data transmitted from the client-side interface 116 using the client clock signal. In an embodiment, a quantity of data is equated with an interval of the client clock signal. For example, a number of clock cycles or clock counts is equated with a number of bytes that are transmitted. The quantity of data that is equated with the number of clock intervals is the conversion factor. As an example, a conversion factor may specify that 6 counts of the client clock signal equates to 96 bytes of transmitted client data.

The client data byte convertor 156 is configured to count cycles of the client clock signal for some interval and to calculate a quantity of transmitted data by multiplying the number of clock intervals by the conversion factor. Once a clock interval is converted to a quantity of data, the quantity of data is passed to the client byte accumulator 158. In an embodiment, the client byte accumulator is a register that is incremented in response to each output from the client data byte convertor.

Conversion factors associated with three different clock regeneration applications are now described. The three applications are ODUk to CBRx/RSn adaptation, ODTU23 multiplexing adaptation, and a back-to-back ODT23 multiplexer adaptation function with an ODUk to CBRx/RSn adaptation function. FIG. 7 illustrates a table of conversion factors for the three different carrier to client clock conversion applications. The conversion factors can be stored in programmable registers of the byte-level clock processor so that the byte-level clock processor can be programmed to handle any of the applications. Although three different applications are described herein, other applications are possible.

The first conversion application in an OTN transport system is an ODUkP to CBRx/RSn adaptation function. In this application, the carrier network is an OTN network that uses OTU2 or OTU3 and the client network uses CBRx (any bit transparent service), SONET/SDH (RSn). The carrier clock signal is the OTU2 or OTU3 clock signal, the carrier clock information includes JC, NJO, and PJO in OPU2 or OPU3, and the client clock signal is the CBRx or RSn clock signal. Examples of the ODUkP to CBRx/RSn adaptation function are provided in rows 1-8 of FIG. 7. As indicated FIG. 7, the actual quantity of client data that is received per OTN protocol data unit is calculated by subtracting the overhead (16 bytes), the fixed stuffing (2×16 bytes), and FEC data (256 bytes) from the OTN protocol data unit and by taking into account the clock adjustment byte, e.g., the JC bytes. For example, with reference to FIG. 7, in the case of an OPU3 to 40 G CBR (with OTN FEC), a clock interval of 255 counts of the carrier clock signal is equivalent to 3,776 bytes of received client data. The quantity of received client data must be adjusted to account for the JC bytes. The actual quantity of client data that is transmitted by the client-side interface is calculated by multiplying the width of the transmission path (e.g., the channel width) by the clock count of the client clock signal. For example, with a 16-byte transmission path, a clock interval of six counts of the client clock signal is equivalent to 96 bytes of transmitted client data.

The second conversion application in an OTN transport system is an ODTU23 multiplexing adaptation. In the ODTU23 Multiplexing application, the carrier is OTU3 and the client is OTU2. The carrier clock signal is the OTU3 clock signal, the carrier clock information includes JC, NJO, PJO1, and PJO2, and the client clock signal is the OTU2 clock signal. Examples of the ODTU23 multiplexing adaptation function are provided in rows 9-12 of FIG. 7. As indicated in FIG. 7, the client data carried in the OTU3 includes four independent ODU2s. For each client, the actual quantity of client data carried in an OPU3 is one quarter of the OPU3 payload capacity. The quantity of received client data must be adjusted to account for the JC bytes. When sending the client data to the client network, these ODU2 frames can be wrapped in OTU2 frames which have FEC bytes. In this case, the data sent to client needs to discount the FEC bytes.

The third conversion application in an OTN transport system is a back-to-back ODTU23 Mux adaptation and ODUkP to CBRx/RSn adaptation function. In this application, the carrier is OTU3 and the client is CBRx/RSn. The carrier clock signal is the OTU3 clock signal, the carrier clock information includes JC, NJO, PJO1, and PJO2 in the OPU3 overhead, and JC, NJO, and PJO in the OPU2 overhead, and the client clock signal is the CBRx or RSn clock signal. Examples of the back-to-back ODTU23 multiplexing adaptation function and ODU2P to CBRx/RSn adaptation function are illustrated in rows 13-18 of FIG. 7. As indicated in FIG. 7, there are two layers of carrier-to-client relationships. The OTU3 layer overhead and FEC are discounted and one quarter of the OPU3 payload capacity is factored in, in the first layer which handles OTU3 to ODU2 de-multiplexing. The ODU2 overhead and fixed stuffing are discounted in the second layer, which performs the ODUkP to CBRx/RSn adaptation function. To calculate the actual client data carried in the OTU3, byte discounting in both layers is compounded. The quantity of received client data must be adjusted to account for the JC bytes.

Referring again back to FIG. 4, once the quantity of client data received and transmitted is calculated by the carrier-side and client-side quantizers 140 and 142, the adder 144 receives inputs from the carrier-side and client-side quantizers and outputs a difference value that takes into account the byte count and any byte adjustments from the carrier-side quantizer and the byte count from the client-side quantizer. In an embodiment, the difference value is calculated on a periodic basis of, for example, once every 16, 64, or 256 OTN protocol data units. The output of the adder 144 is provided as an input to adder 146. Adder 146 adds a threshold adjust value to the difference value and the difference value is provided to the byte difference accumulator 148. The byte difference accumulator is a register that accumulates the difference value that is output from the adder 146. In an embodiment, the adder 144 is a 3-input arithmetic logic unit (ALU) and the adder 146 is a 2-input ALU, both of which are implemented in hardware. Although the adders are implemented as hardware-based ALUs, other embodiments are possible.

The low pass filter 132 of the byte-level clock processor 122 is configured to remove temporal burstiness from the difference value and includes scalers 170, a last clock difference register 172, and an adder 174. In an embodiment, the scalers and adder are implemented in hardware as ALUs. In an embodiment, the low pass filter implements the following smoothing function:

ClockDifference=(ByteAccumulation×$X$)+(Last-ClockDifference×(1−$X$))

Where, X=scaling factor
In an embodiment, the low pass filter can be configured to implement either an Infinite Impulse Response (IIR) filter function or a Finite Impulse Response (FIR) filter function. To implement the above-identified smoothing function, the last clock difference register holds the last clock difference value and the multipliers perform the multiplication operations of the scaling function. The adder is an ALU that outputs the sum of the ByteAccumulation×X operation and the Last-ClockDifference×(1−X) operation. Although one embodiment of a low pass filter is described, other embodiments are possible.

The clock adjust module 134 of the byte-level clock processor 122 is configured to determine whether or not the clock signal needs to be adjusted and includes a threshold adjust module 176 and a clock adjust accumulator 178. In an embodiment, the threshold adjust module compares the smoothed difference value to a programmable threshold range having an upper threshold, A, and a lower threshold, B. If the accumulated difference value is greater than threshold A, then a negative, or decrement, output is provided to the clock adjust accumulator. If the accumulated difference value is less than threshold B, then a positive, or increment, output is provided to the clock adjust accumulator. If the accumulated difference value falls within the programmed threshold range, then neither a positive nor a negative output is provided to the clock adjust accumulator. The threshold range acts to clip the clock control response so that the clock response does not swing out of a pre-defined range. The output of the threshold adjust module (referred to herein as the "clock_adjust" value) represents how much the difference value exceeds either threshold A or threshold B. The clock_adjust value is also fed back to the clock difference detector to compensate for the loss caused by the clipping. In an embodiment, the threshold range can be programmed to correspond to the particular response behavior of the DDS clock source. Although one embodiment of a clipping mechanism is described, other clipping mechanisms are possible.

The clock adjust accumulator 178 of the clock adjust module 134 accumulates the outputs (clock_adjust) from the threshold adjust module 176. In an embodiment, the clock adjust accumulator is a register that is incremented or decremented in response to the positive and negative outputs from the threshold adjust module. The output of the clock adjust accumulator is an accumulated clock adjust value, referred to herein as "acc_jc."

The frequency command controller 136 of the byte-level clock processor 122 generates frequency control commands in response to the accumulated clock adjust value, acc_jc, and includes a gain lookup table 180, a frequency command table 182, an adder 184, and a current client frequency count register 186. In an embodiment, the gain lookup table periodically checks the accumulated clock adjust value, acc_jc, from the clock adjust accumulator and uses the value as an index into the gain lookup table. The index points to a value that is added to a current frequency control value and the summed output is used to select an updated frequency control command from the frequency command table. In an embodiment, the adder is implemented in hardware as an ALU and the periodic checks of the frequency command table are made every 16, 64, or 256 OTN frames although other intervals are possible.

In operation, when the amount of client data received at the edge node 104 is calculated to be greater than the amount of client data that is transmitted from the edge node, the frequency control command that is output from the byte-level clock processor causes the frequency of the client clock signal to be increased and when the amount of client data received at the edge node is calculated to be less than the amount of client data that is transmitted from the edge node, the frequency control command that is output from the byte-level clock processor causes the frequency of the client clock signal to be decreased. Although one embodiment of the byte-level clock processor is described herein, other embodiments of the byte-level clock processor are possible. In particular, other embodiments that use the carrier and client clock signals to calculate the quantities of client data that are received at and transmitted from an edge node are possible. In an embodiment, the byte-level clock processor 122 as described above with reference to FIGS. 2-8 is implemented in an ASIC although other implementations are possible.

Figure 8A:
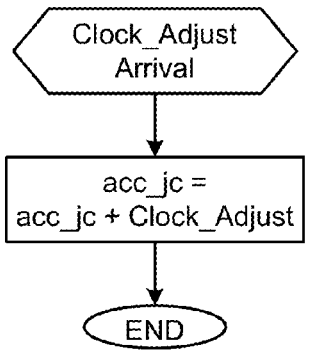
FIGS. 8A-8C illustrate an example of an algorithm for operating the frequency command controller of the byte-level clock processor of FIG. 4.
Figure 8C:
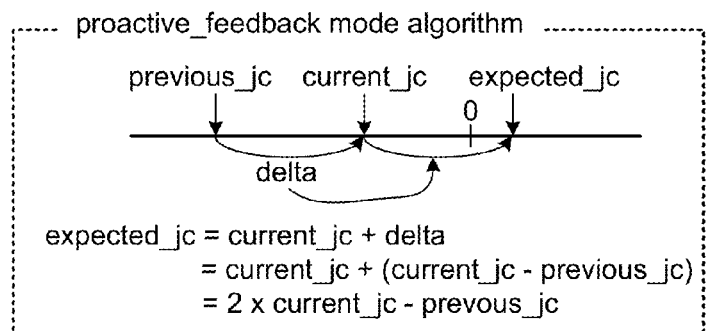
Figure 8B:
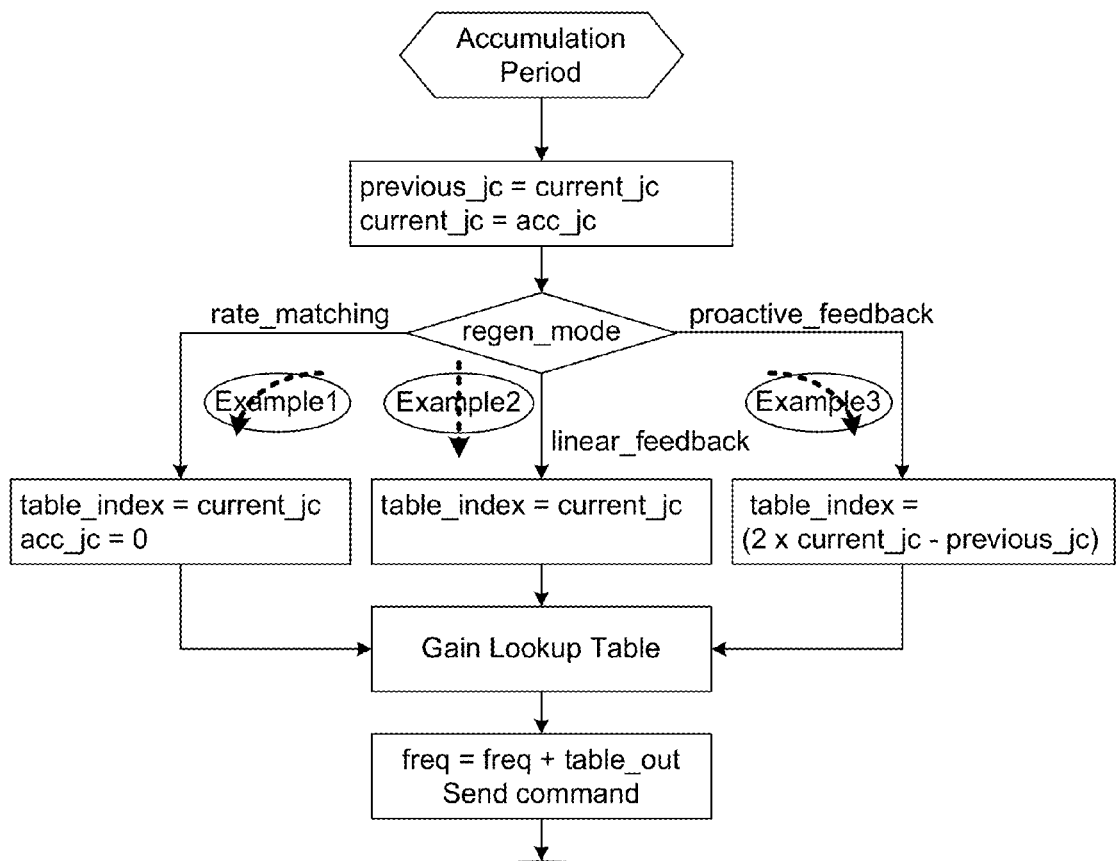

An example of an algorithm for operating the frequency command controller 136 of the byte-level clock processor 122 is illustrated in FIGS. 8A-8C. In general, the goal of the algorithm is to make "acc_jc", the accumulated value of clock_adjust, as close to zero as possible. When acc_jc equals zero, the clock regenerator is in a "LOCK" condition in which the quantity of incoming client data and the quantity of outgoing client data is perfectly matched. FIG. 8A depicts an algorithm for calculating acc_jc.

FIG. 8B illustrates an algorithm that includes examples of three different frequency control techniques. The first example is "rate_matching", which is a good technique for finding the target frequency quickly. In this example, the frequency adjust value is indexed by "current_jc" (the value of acc_jc at the end of an accumulation interval). If the value of current_jc is large, the adjust value is large. If the value of current_jc is small, the adjust value is small. After every adjustment, acc_jc is cleared. When current_jc stays at zero for a certain number of periods, the frequency is in the LOCK condition. In the long term, this algorithm may not be ideal because of the rounded down value from acc_jc. This algorithm is used to match the carrier and client clock frequency rate, not to match the exact quantity of data received and transmitted.

On the contrary, both the second and third examples are designed to match the exact quantity of received and transmitted data. The second algorithm, referred to as "linear_feedback," is the same as the rate_matching algorithm without clearing acc_jc. The third algorithm, referred to as "proactive_feedback," calculates the adjust value with a "delta," the difference between "previous_jc" (the value of acc_jc of the previous accumulation period) and current_jc. The calculation method is illustrated in FIG. 8C.

Figure 9:
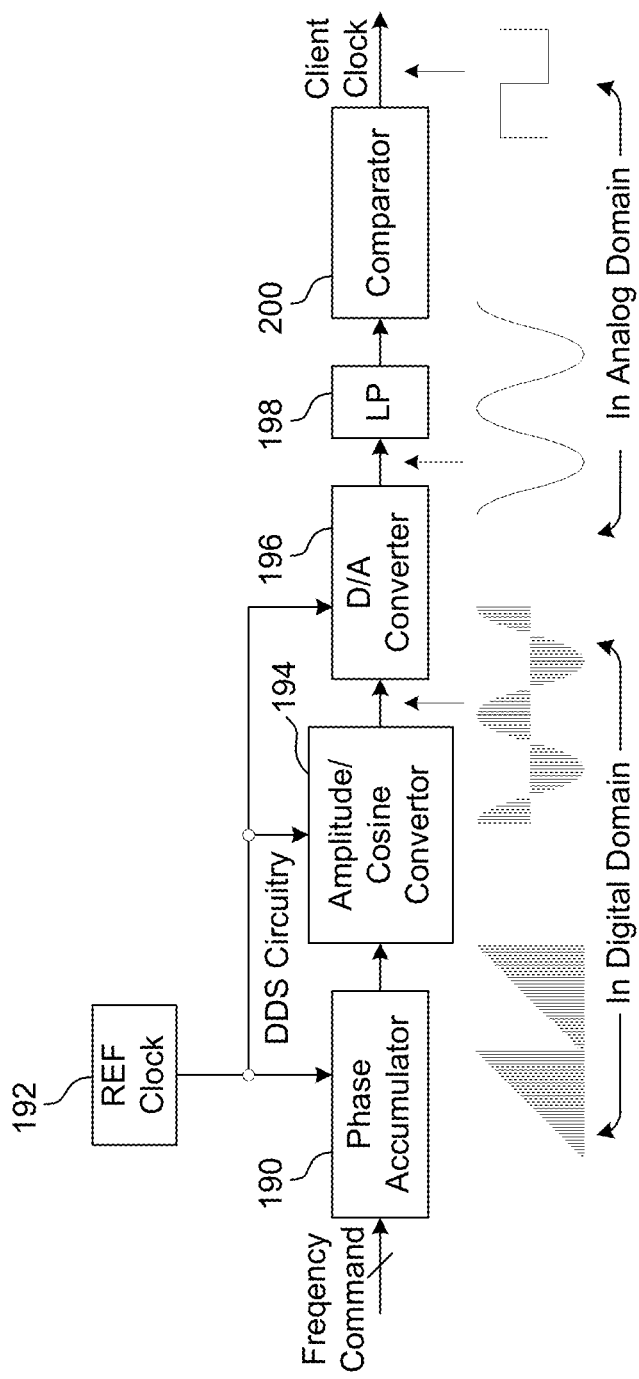
FIG. 9 depicts an embodiment of the DDS clock source from FIG. 3.

FIG. 9 depicts an embodiment of the DDS clock source 124 from FIG. 3. The DDS clock source includes a digital front end that includes a phase accumulator 190, a reference clock 192, an amplitude/cosine convertor 194, and a digital to analog converter (DAC) 196 and an analog back end that includes the DAC, a low pass filter 198, and a comparator 200. The DDS clock source uses the digital front-end to create periodic digital value sequence. In an embodiment, the phase accumulator is a running counter that generates a sequentially incremented binary counter value. The counter value then goes through cosine conversion at the amplitude/cosine converter to generate a digital sine wave. The digital sine wave goes through the DAC, which converts the digital sine wave to an analog sine wave. The analog low pass filer cleans up potential noise in the analog sine wave and the comparator converts the analog sine wave to a square wave. The square wave is output as the client clock signal. DDS clock sources are known and the specific components of the DDS clock source are not described in more detail herein. Additionally, although the clock source is described as a DDS clock source other types of clock sources may be utilized.

In some embodiments, the combination of the cascaded byte-level clock processor 122 and DDS clock source 124 can be used for an ITU-T G.798 ODUkP to CBRx adaptation sink function, an ITU-T G.798 ODUkP to RSn adaptation sink function, an ITU-T G.798 ODUkP to ODU[i]j adaptation sink function, a cascaded ODUkP to ODU[i]j adaptation adaption and ODUkP to CBRx adaptation sink function, or a cascaded ODUkP to ODU[i]j adaptation adaption and ODUkP to RSn adaptation sink function.

In an embodiment, the carrier data byte converter 150 of the carrier-side quantizer 140 is programmable to adapt to different communications protocols and to adapt to different applications. For example, the programming involves setting the conversion factor to reflect the quantity of client data carried by the carrier. The client data byte converter is programmable to reflect different frame formats that may be used at the client-side interface 116. The scaling factor in the low pass filter 132 can be programmed to control the response of the low pass filter. The threshold range used by the clock adjust module 134 can be programmed to limit the lower and upper bounds of the accumulated value of clock_adjust. Likewise, the gain lookup table 180 and the frequency command table can be programmed to adapt to different DDS clock sources.

The above-provided description uses the terms "carrier clock signal" and "client clock signal," however, these two clock signals could alternatively be referred to as a first clock signal and a second clock signal. Additionally, the terms "carrier network" and "client network" could alternatively be referred to as a first network and a second network.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts as described and illustrated herein. The invention is limited only by the claims.

What is claimed is:

1. A system for regenerating a client clock signal for use in optical communications, the system comprising:
   a clock signal generator configured to generate a client clock signal; and
   a clock processor configured to receive the client clock signal and a carrier clock signal, the clock processor having;
      a carrier-side quantizer configured to calculate a carrier-side data quantity in response to the carrier clock signal;
      a client-side quantizer configured to calculate a client-side data quantity in response to the client clock; and
      a frequency command controller configured to generate a frequency command in response to the difference between the carrier-side data quantity and the client-side data quantity;

wherein the clock signal generator is adjusted in response to the frequency command.

2. The system of claim 1 wherein the carrier-side quantizer is configured to equate an interval of the carrier clock signal with a data quantity.

3. The method of claim 1 wherein the carrier-side quantizer is configured to count a number of clock intervals of the carrier clock signal and to multiply the equated data quantity by the counted number of intervals of the carrier clock signal.

4. The system of claim 1 wherein the client-side quantizer is configured to equate an interval of the client clock signal with a data quantity.

5. The method of claim 1 wherein the client-side quantizer is configured to count a number of clock intervals of the client clock signal and to multiply the equated data quantity by the counted number of intervals of the client clock signal.

6. The system of claim 1 wherein:
the carrier-side quantizer is configured to equate an interval of the carrier clock signal with a data quantity, to count a number of clock intervals of the carrier clock signal, and to multiply the equated data quantity by the counted number of intervals of the carrier clock signal; and
the client-side quantizer is configured to equate an interval of the client clock signal with a data quantity, to count a number of clock intervals of the client clock signal, and to multiply the equated data quantity by the counted number of intervals of the client clock signal.

7. The system of claim 1 wherein the carrier-side quantizer comprises a carrier-side data convertor configured to convert the carrier-side clock signal to an equivalent data quantity and a carrier-side accumulator configured to accumulate the equivalent data quantity over a pre-established interval to generate the carrier-side data quantity.

8. The system of claim 1 wherein the carrier-side quantizer further comprises a carrier-side clock information interpreter configured to adjust the carrier-side data quantity in response to carrier clock information that is encoded in a carrier-side protocol data unit.

9. The system of claim 1 wherein the client-side quantizer comprises a client-side data convertor configured to convert the client-side clock signal to an equivalent data quantity and a client-side accumulator configured to accumulate the equivalent data quantity over a pre-established interval to generate the client-side data quantity.

10. The system of claim 1 further comprising an adder configured to find the difference between the client-side data quantity and the carrier-side data quantity.

11. A method for regenerating a client clock signal for use in optical communications, the method comprising:
at a clock processor:
generating a client clock signal;
calculating a quantity of data that is received at a carrier interface, wherein the calculation is made in response to a carrier clock signal;
calculating a quantity of data that is received at a client interface, wherein the calculation is made in response to the client clock signal; and
adjusting the frequency of the client clock signal in response to the difference between the quantity of data that is received at the carrier interface and the quantity of data that is received at the client interface;
wherein calculating the quantity of data that is received at the carrier interface further comprises counting a number of clock intervals of the carrier clock signal and multiplying the equated data quantity by the counted number of intervals of the carrier clock signal.

12. The method of claim 11 wherein calculating the quantity of data that is received at the carrier interface comprises equating an interval of the carrier clock signal with a data quantity.

13. The method of claim 11 wherein calculating the quantity of data that is received at the client interface comprises equating an interval of the client clock signal with a data quantity.

14. The method of claim 11 wherein calculating the quantity of data that is received at the client interface further comprises counting a number of clock intervals of the client clock signal and multiplying the equated data quantity by the counted number of intervals of the client clock signal.

15. A method for regenerating a client clock signal for use in optical communications, the method comprising:
at a clock processor:
generating a client clock signal;
calculating a quantity of data that is received at a carrier interface, wherein the calculation is made in response to a carrier clock signal;
calculating a quantity of data that is received at a client interface, wherein the calculation is made in response to the client clock signal; and
adjusting the frequency of the client clock signal in response to the difference between the quantity of data that is received at the carrier interface and the quantity of data that is received at the client interface;
wherein calculating the quantity of data that is received at the client interface further comprises counting a number of clock intervals of the client clock signal and multiplying the equated data quantity by the counted number of intervals of the client clock signal.

16. The method of claim 15 wherein calculating the quantity of data that is received at the carrier interface comprises equating an interval of the carrier clock signal with a data quantity.

17. The method of claim 15 wherein calculating the quantity of data that is received at the carrier interface further comprises counting a number of clock intervals of the carrier clock signal and multiplying the equated data quantity by the counted number of intervals of the carrier clock signal.

18. The method of claim 15 wherein calculating the quantity of data that is received at the client interface comprises equating an interval of the client clock signal with a data quantity.

* * * * *